(12) United States Patent
Copeland

(10) Patent No.: US 6,942,809 B2
(45) Date of Patent: Sep. 13, 2005

(54) METHOD FOR TREATING SOYBEAN REFINERY WASTEWATER

(75) Inventor: Dick Copeland, Omaha, NE (US)

(73) Assignee: IP Holdings, L.L.C., Omaha, NE (US)

( * ) Notice: Subject to any disclaimer, the term of this patent is extended or adjusted under 35 U.S.C. 154(b) by 110 days.

(21) Appl. No.: 10/461,719

(22) Filed: Jun. 13, 2003

(65) Prior Publication Data

US 2004/0251209 A1 Dec. 16, 2004

(51) Int. Cl.[7] ................................................. C02F 1/52
(52) U.S. Cl. .................... 210/724; 210/712; 210/738
(58) Field of Search ................................ 210/702, 712, 210/723, 724, 726, 738, 905

(56) References Cited

U.S. PATENT DOCUMENTS

| | | | |
|---|---|---|---|
| 3,959,129 A | 5/1976 | White et al. | 210/28 |
| 3,986,953 A | 10/1976 | Beaucaire | 210/43 |
| 4,049,545 A | 9/1977 | Horvath | 210/28 |
| 4,169,053 A | 9/1979 | Sakakibara et al. | 210/49 |
| 4,183,807 A * | 1/1980 | Yoshizawa et al. | 210/611 |
| 4,200,526 A | 4/1980 | Johnson et al. | 210/23 |
| 4,211,646 A | 7/1980 | Westbrook et al. | 210/15 |
| 4,293,416 A * | 10/1981 | Keoteklian | 210/208 |
| 4,415,467 A | 11/1983 | Piepho | 252/181 |
| 4,507,207 A | 3/1985 | Verhoeve et al. | 210/714 |
| 5,174,903 A * | 12/1992 | Miller | 210/725 |
| 5,330,658 A | 7/1994 | Grant et al. | 260/717 |
| 5,972,211 A * | 10/1999 | Jones | 210/90 |
| 6,132,625 A * | 10/2000 | Moffett | 210/727 |

OTHER PUBLICATIONS

Smallwood, Norman J., "Environmental Concerns in Soybean Processing," *Practical Handbook of Soybean Processing and Utilization*, Chapter 25:504–518 (David R. Erickson, ed. 1995).

* cited by examiner

*Primary Examiner*—Peter A. Hruskoci
(74) *Attorney, Agent, or Firm*—McDonnell Boehnen Hulbert & Berghoff LLP

(57) ABSTRACT

This invention relates to a method for treating soybean refinery wastewater. More particularly, this invention relates to a method for treating soybean refinery wastewater with an aqueous iron salt solution to produce purified water. An aqueous iron salt solution is admixed with soybean refinery wastewater, the resulting mixture is agitated and passed through at least one filter device to form a filtered effluent, and the pH of the filtered effluent is adjusted to a value below about 8 to form purified water.

8 Claims, 1 Drawing Sheet

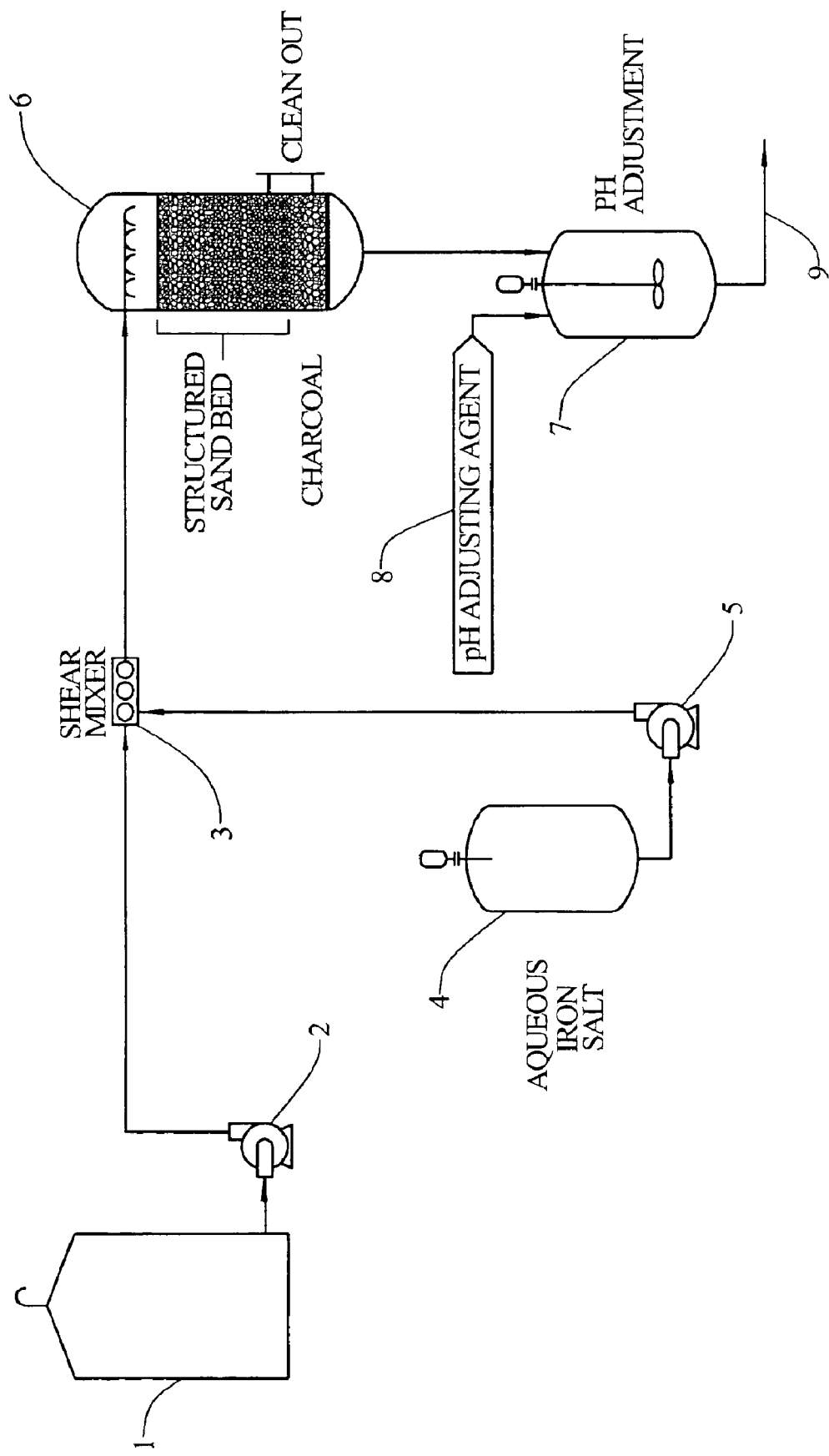

METHOD FOR TREATING SOYBEAN REFINERY WASTEWATER

FIELD OF THE INVENTION

This invention relates to a method for treating soybean refinery wastewater. More particularly, this invention relates to a method for treating soybean refinery wastewater with an aqueous iron salt solution to produce purified water that contains less than about 10 ppm iron and has a transmittance rating of at least about 90 percent.

BACKGROUND OF THE INVENTION

Chemical process operations require enormous amounts of water. In the United States alone, more than 10 billion gallons of water are used every day for manufacturing processes. Accompanying this level of use, large volumes of impure water are produced. There is increasing concern over both the availability of water for chemical process operations and the potential hazards posed by contamination of the surrounding water environment by impure water.

Soybean refinery wastewater streams typically contain various impurities, including but not limited to BODs; CODs; vegetable oils, fats, and greases; processing reagents; miscellaneous organic salts; and suspended solids. Conventional soybean refineries typically generate 100,000 gallons per day of wastewater, including 1200 pounds per day of BODs, 2000 pounds per day of CODs, 290 pounds per day of vegetable oils, fats, and greases, and 180 ppm suspended solids. Discharge of such wastewater streams into municipal sewers or nearby rivers is economically inefficient and subject to strict state and federal environmental protection regulations. Ideally, such wastewater streams are treated so as to remove pollutants and produce process water suitable for reuse in the plant.

Treatment steps for removing wastewater impurities include clarification, coagulation, filtration, membrane separation, ion exchange, ultrafiltration, and chemical treatment. On one hand, by using tailored combinations of these options, contaminant levels can be routinely reduced to the parts per million (ppm) or parts per billion (ppb) range. On the other hand, conducting multi-step treatment can be complex and often requires costly equipment.

Perhaps the most common method of water treatment is the use of iron salt/alkaline flocculation techniques. Treatment with iron salt significantly reduces solubility of contaminants in the wastewater stream, leading to precipitation. However, due to the nature of the precipitate thus formed, which tends to be light, slow to settle, and very fine, treatment with iron salt alone generally has been believed to be inadequate to precipitate contaminants to a degree which permits collection and removal of contaminants to environmentally acceptable levels. For this reason, prior art methods generally add alkaline material in an amount sufficient to increase the pH of the wastewater stream to above about 9 in an effort to promote formation of ferrous hydroxide and/or ferric hydroxide. Alkaline addition is believed to enhance contaminant removal by inducing the precipitates, the contaminants, and/or the ferrous ions to form substantially insoluble coprecipitates with hydroxide ion.

For example, a prior method for removing heavy metal and/or radioactive contaminants from a wastewater stream is disclosed in U.S. Pat. No. 5,330,658. This method comprises mixing wastewater with an aqueous ferrous sulfate solution, adding a hydroxide solution to the resulting mixture, treating the resultant mixture with a flocculent, and separating coprecipitates from the purified stream. Typically the ferrous sulfate solution comprises from about 10 to about 25 percent by weight ferrous sulfate, and the hydroxide solution comprises from about 10 to about 50 percent by weight sodium hydroxide. A disadvantage of this method is that caustic alkali hydroxide solutions must be employed. Such solutions are corrosive and dangerous to handle.

Another prior method for treating wastewater is disclosed in U.S. Pat. No. 4,200,526 comprising the steps of mixing a wastewater stream with an iron salt and an alkaline solution to maintain a pH above about 8, separating effluent from the precipitated solids, filtering the separated effluent, adjusting the pH of the filtered effluent to below about 6, and subjecting the pH adjusted filtered effluent to reverse osmosis. Typically, about 510 pounds of ferrous sulfate and about 510 pounds of lime are required to process about 300,000 gallons of raw wastewater. A disadvantage of this method is the addition of a reverse osmosis step in the overall treatment scheme, which adds processing complexity.

U.S. Pat. No. 3,959,129 describes a process for treating wastewater of the type typically produced in conventional container manufacturing installations. The process comprises the steps of mixing a wastewater stream with an iron salt and agitating the resulting mixture, mixing calcium hydroxide with the agitated mixture and again agitating the resulting mixture, and finally passing the resulting mixture over the cylindrical outer surface portions of a horizontally rotating drum of a vacuum filter assembly. Generally, up to 5000 ppm iron salt and up to 5000 ppm calcium hydroxide are added, with an agitation time of about one hour after each addition. The effluent is drawn by vacuum into the interior of the vacuum filter assembly, and a filter cake is deposited on the outer cylindrical portions thereof. A disadvantage of this method is that it requires vacuum equipment and requires continual monitoring and removal of filter cake.

Further improvements in purifying wastewater streams continue to be sought. Thus, there is a need for a simplified, easy-to-operate method of treating large volumes of solutions containing soluble and insoluble organic and inorganic contaminants that effectively segregates the contaminants to produce a clean effluent and concentrates the contaminated material into a manageable, low-volume, concentrated waste stream. There is a further need for a wastewater treatment method that requires a minimal amount of equipment and is economical and safe to operate.

The present invention relates to a process having advantages over those previously disclosed. In particular, this invention relates to a method for treating soybean refinery wastewater with an aqueous iron salt solution to produce purified water that contains less than about 10 ppm iron and has a transmittance rating of at least about 90 percent. Surprisingly and unexpectedly, no addition of alkaline material is required in the present invention. The present invention allows virtually the entire wastewater stream produced by a soybean refinery to be treated and reused, thereby creating substantial savings.

SUMMARY OF THE INVENTION

This invention relates to a method for treating soybean refinery wastewater with an aqueous iron salt solution to produce purified water. Thus, in a first aspect the invention provides a method for treating soybean refinery wastewater comprising admixing an aqueous iron salt solution with a wastewater stream; agitating the resulting mixture for a time of less than about 5 minutes; passing the agitated mixture through at least one filter device to form a filtered effluent;

and adjusting the pH of the filtered effluent to below about 8 to form purified water.

In another aspect, the invention provides a method for treating soybean refinery wastewater comprising admixing an aqueous ferrous sulfate solution with a wastewater stream; agitating the resulting mixture for a time of less than about 5 minutes; passing the agitated mixture through at least one filter device to form a filtered effluent; and adjusting the pH of the filtered effluent to about 7 to form purified water.

In another aspect, the invention provides a method for treating soybean refinery wastewater to produce a purified water that contains less than about 10 ppm iron and has a transmittance rating of at least about 90 percent.

These and other objects are achieved by treating soybean refinery wastewater in a simple, four-step process employing readily available and inexpensive raw materials and processing equipment. These and other objects of the invention will become apparent in light of the detailed description below.

BRIEF DESCRIPTION OF THE DRAWINGS

FIG. 1 is a process flow scheme suitable for carrying out the soybean refinery wastewater treatment process of the invention.

DESCRIPTION OF A PREFERRED EMBODIMENT

The method for treating soybean refinery wastewater can be conducted as a batch or a continuous process. As illustrated in FIG. 1, soybean refinery wastewater is supplied from a storage tank 1 through pump 2 to a shear mixer 3. Typical soybean refining employs the steps of degumming, refining, bleaching, and deodorizing. The wastewater to be treated can be obtained from the wastewater produced from use of process water in any one or combination of these refining steps employed to produce a refined vegetable oil. Typical wastewater sources include but are not limited to any one or combination of process water used to remove phosphatides from crude oil, especially water from organic refining processes; wash water from water-washed centrifuges employed in caustic refining processes; condensables from bleaching vacuum systems; condensables from oil deodorizer vacuum systems; condensables from oil deodorizer vacuum systems; and condensables from vacuum systems employed in lecithin drying.

While the process of the invention is not temperature critical, the soybean refinery wastewater is ideally in the range of about 100° F. to about 130° F., and preferably about 100° F. In practice, temperature adjustment is usually not necessary. Similarly, although the pH of the wastewater to be treated is not critical, pH can be adjusted to a desired level.

The soybean refinery wastewater is introduced into a shear mixer 3 wherein it is combined with an aqueous iron salt solution supplied from a source 4 via pump 5. When the present invention is carried out as a batch process, the wastewater and the aqueous iron salt solution can be introduced sequentially or simultaneously and in any order into shear mixer 3. When the present invention is carried out as a continuous process, the wastewater and the aqueous iron salt solution are introduced simultaneously into shear mixer 3. The temperature of the aqueous iron salt solution is not critical, but optionally can be heated or cooled prior to its addition into shear mixer 3.

Generally, shear mixer 3 can be any agitation device that thoroughly mixes the wastewater and aqueous iron salt solution. Preferably, however, shear mixer 3 is a static mixer. Static mixers are tubular structures having fixed interior mixing elements which simultaneously divide flow and provide high intensity radial mixing. Such mixers are commercially available under the tradenames Kenics Static Mixer, Komax Motionless Blender, Lightnin Series 50 In-Line Blender, Ross Motionless Mixer, and Sulzer Static Mixer. A particularly preferred static mixer is a Kenics Static Mixer available from Chemineer providing a flow velocity of generally at least about 14 feet per second. Generally, the wastewater and aqueous iron salt solution are mixed for a time of less than about 10 minutes, and preferably less than about 5 minutes.

The aqueous iron salt solution may be prepared from any iron salt, including but not limited to ferrous sulfate, ferric sulfate, and ferric chloride, or combinations thereof. A particularly preferred iron salt is ferrous sulfate. The aqueous iron salt solution can be prepared by dissolving an appropriate amount of a solid iron salt in water, or it can be prepared by further diluting a previously prepared aqueous iron salt solution of greater strength. In preparing the aqueous iron salt solution, demineralized water is preferably used. As used herein, the term demineralized water means water substantially devoid of calcium and magnesium ions.

The aqueous iron salt solution has a concentration based on the combined weight of iron salt and water of from about 10 to about 70 percent by weight, preferably from about 25 to about 60 percent by weight, and most preferably from about 45 to about 55 percent by weight. The aqueous iron salt solution is combined with the wastewater in a ratio of from about 1:1 to about 0.01:1, and most preferably in a ratio of about 0.1:1, depending on the source or sources from which the wastewater is derived.

The agitated mixture of wastewater and aqueous iron salt solution is then passed through at least one filter device 6. Although nearly any device capable of filtering precipitates will suffice, preferably filter device 6 is a structured particulate bed. Any convenient particulate that is inert, water-insoluble, and has a particle size of below about 250 μm will suffice. Most preferably, filter device 6 is a structured sand bed. Filtration removes impurities such as precipitates and suspended solids from effluent. As the mixture of wastewater and aqueous iron salt passes through the filter device 6, impurities are retained in the filter media and a filtered effluent results.

Filter devices primarily remove impurities by the mechanisms of entrapment and adhesion. Entrapment involves mechanical retention, which is related to the size, homogeneity, and depth of the particular filter media. When filter device 6 is a structured sand bed, other factors in addition to bed depth that regulate mechanical retention include void areas and flow channels that form in the bed.

Compared to filter beds comprising other filter media such as anthracite or garnet, a sand bed produces void areas that are more uniform, and thus produces a finer level of filtration. However, because most of the impurities are retained at or near the top of the sand bed, a "cake" can result which hinders filtration and causes pressure drop to increase rapidly. Thus, to minimize cake formation, sand beds are often structured from coarse particles at the top to finer particles at depth. Optionally, but preferably, a layer of charcoal is placed beneath the structured sand bed. As the mixture of wastewater and aqueous iron salt passes through the charcoal, any objectionable odor-causing compounds are absorbed.

In addition to mechanical retention, structured-bed filters also remove impurities by the mechanism of adhesion. Adhesion results from chemical bonding, van der Waals forces, and electrostatic forces. In water, most solids carry an electrical charge that is almost always negative. Charged particles create forces that cause adhesion to take place. In a structured sand bed, mechanical entrapment brings impurities near the sand while adhesive forces hold the impurities until they can be removed by backwashing.

When filter device 6 is a structured sand bed, the agitated mixture of wastewater and aqueous iron salt solution is passed through the bed until a particle breakthrough occurs, or until a threshold pressure drop is reached. Thereafter, the structured sand bed must be cleaned to restore pressure drop and effluent quality to target values. The structured sand bed retains impurities and produces a filtered effluent.

The structured sand bed can be housed within a containment vessel having any convenient internal geometry. Preferably, however, the structured sand bed is housed within a cyclindrical containment vessel. Generally, the structured sand bed comprises a layer of sand from about 3 to about 6 feet in depth. When charcoal is additionally employed in the structured sand bed, it is present in a layer of about 1 feet in depth and is located so that the mixture of wastewater and aqueous iron salt passes through the charcoal after it has passed through the sand. Optionally, but preferably, the sand bed rests atop a stainless steel plate having a plurality of ⅛" diameter holes to allow fluid flow.

The filtered effluent is fed by gravity to a low shear mixer 7 wherein it is combined with a pH adjusting agent provided from a source 8. When the present invention is carried out as a batch process, the filtered effluent and the pH adjusting agent can be introduced sequentially or simultaneously and in any order into low shear mixer 7. When the present invention is carried out as a continuous process, the filtered effluent and the pH adjusting agent are introduced simultaneously into low shear mixer 7. The temperature of the pH adjusting agent is not critical, but optionally can be heated or cooled to equalize temperature with the filtered effluent prior to its addition into low shear mixer 7.

The filtered effluent and the pH adjusting agent are mixed at low shear for a time sufficient to produce a purified water stream 9 having a pH of less than about 8. Mixing parameters are selected according to the mechanical design of the low shear mixer. Important mixer design criteria include the ratio of tank height to tank diameter, the ratio of impeller diameter to tank diameter, and the number and positioning of individual blades on the impeller. A preferred low shear mixer 7 is a 250 or 500 gallon Retention Mixer available from Alfa Laval and having a tank height to tank diameter ratio of about 4:1. Preferably, low shear mixer 7 employs from about 40 to about 60 axial flow impellers disposed along a mixing shaft connected to a motor generating from about 5 to about 7.5 horsepower.

The pH adjusting agent can be any suitable organic or inorganic acid. Preferably, the pH adjusting agent is sulfuric acid. The pH adjusting agent is added in amount sufficient to reduce the pH of the filtered effluent to below about 8, preferably to a value of from about 6 to 7.5, and most preferably to a value of from about 6.8 to 7.2. Any convenient concentration of acid may be used. When a 1.0 N sulfuric acid solution is the pH adjusting agent, it is combined with the filtered effluent in a ratio of from about 1:15 to about 1:50, and most preferably about 1:25, depending on the source or sources from which the wastewater is derived.

Surprisingly and unexpectedly, the purified water stream 9 produced by the wastewater treatment process of the invention contains less than about 10 ppm iron and has a transmittance rating of at least about 90 percent. Accordingly, the purified water stream 9 is at least equal in purity, and often better, compared to soft water that has never passed through any step of the refining process.

The purified water stream 9 can be recycled without other treatment for use in earlier steps of the refining process. Because wastewater need not be sent to disposal and instead can be treated according to the invention and recycled without the need for additional and expensive treatment, the soybean refinery wastewater treatment process of the invention generates substantially no discharge water. Since disposal costs associated with discharge water represents a significant drain on operating profit, the process of the invention generates substantial cost savings.

All documents, e.g., patents, journal articles, and textbooks, cited above or below are hereby incorporated by reference in their entirety.

One skilled in the art will recognize that modifications may be made in the present invention without deviating from the spirit or scope of the invention. The invention is illustrated further by the following examples, which are not to be construed as limiting the invention in spirit or scope to the specific procedures or compositions described therein.

EXAMPLE 1

An aqueous solution of 0.10 percent ferrous sulfate heptahydrate was added to a wastewater comprising a 50/50 blend of bleaching vacuum system wastewater and deodorizer vacuum system wastewater and the mixture agitated at room temperature. The mixture was then filtered through a sand bed to remove impurities and produce a filtered effluent. Finally, the pH of the filtered effluent was adjusted with 1.0 N sulfuric acid in a ratio of about 1:24.4 sulfuric acid to filtered effluent. An analysis of ion content and percent transmittance was made at various treatment stages, and the results are shown in Table I.

TABLE I

Water Analysis

| Sample | Iron (ppm) | Sodium (ppm) | Sulfur (ppm) | % Light Transmission |
|---|---|---|---|---|
| 50/50 bleaching vacuum system/deodorizer vaccum system wastewater (as is) | 30 | 559 | 95 | 10.5 |
| 50/50 bleaching vacuum system/deodorizer vaccum system wastewater (after FeSO$_4$ and filtration) | 5 | 594 | 164 | — |
| 50/50 bleaching vacuum system/deodorizer vaccum system wastewater (after FeSO$_4$, filtration, and pH adjustment) | 4 | 583 | 761 | 91.7 |
| Soft Water | 5 | 47 | 44 | 86.5 |

As the results in Table I illustrate, the process of the invention reduced iron content from 30 to 5 ppm, and increased transmittance from 10.5 to 91.7. Transmittance ratings were determined spectrophotometrically at 630 nm using deionized (distilled) water as the 100 percent transmittance standard. As percent light transmission of a water sample increases, there is a corresponding increase in the visual clarity of the water sample. The percent transmittance of wastewater treated according to the process of the invention was actually better than the transmittance of otherwise unprocessed soft water.

EXAMPLE 2

The wastewater treated according to Example 1 was used to water wash refined soybean oil in a ratio of 1:10 treated wastewater to refined oil. Tables II and III summarize the results of analyses of color, soap content, free fatty acid content, and metals content of oil washed with wastewater treated according to the invention and oil washed with soft water.

TABLE II

Oil Analysis After Water Wash

| Sample | Soap (ppm) | Color (Red) | % Free Fatty Acid |
|---|---|---|---|
| Refined Soybean Oil | 532 | 8.0 | 0.04 |
| Refined Soybean Oil washed with wastewater treated according to the invention | 106 | 8.0 | 0.06 |
| Refined Soybean Oil washed with soft water | 380 | 8.0 | 0.04 |

TABLE III

Oil Analysis After Water Wash

| Sample | P Ppm | Fe ppm | Mg ppm | Ca ppm | Ni ppm | Cu ppm | Na ppm |
|---|---|---|---|---|---|---|---|
| Refined Soybean Oil | 20.8 | 0.27 | 2.81 | 1.94 | 0.29 | 0.11 | 44.8 |
| Refined Soybean Oil washed with wastewater treated according to the invention | 0.9 | 0.06 | 0.21 | 0.05 | 0.09 | 0.01 | 1.8 |
| Refined Soybean Oil washed with soft water | 4.9 | 0.09 | 0.65 | 0.57 | 0.09 | 0.01 | 11.0 |

As the results in Table II illustrate, the quality of refined oil washed with wastewater treated according to the invention is superior to the quality of the same refined oil washed with soft water. In particular, wastewater treated according to the invention functioned more effectively than soft water in removing soap (80% removal of soap, compared to 29% removal of soap). The results shown in Table IV demonstrate that wastewater treated according to the invention was just as effective as soft water in removing trace metals.

EXAMPLE 3

The water washed refined soybean oil samples evaluated in Example 2 were bleached under vacuum using activated bleaching clay and analyzed for color, soap content, free fatty acid content, and metals content. The results of these analyses are shown in Tables IV and V.

TABLE IV

Oil Analysis After Bleaching

| Sample | Soap (ppm) | Color (Red) | % Free Fatty Acid |
|---|---|---|---|
| Refined Soybean Oil washed with wastewater treated according to the invention | 0 | 3.0 | 0.07 |
| Refined Soybean Oil washed with soft water | 0 | 4.0 | 0.09 |

TABLE V

Oil Analysis After Bleaching

| Sample | P Ppm | Fe ppm | Mg ppm | Ca ppm | Ni ppm | Cu ppm | Na ppm |
|---|---|---|---|---|---|---|---|
| Refined Soybean Oil washed with wastewater treated according to the invention | 0.18 | 0.12 | 0.29 | 0.05 | 0.12 | 0.01 | 0.09 |
| Refined Soybean Oil washed with soft water | 0.50 | 0.08 | 0.19 | 0.76 | 0.09 | 0.02 | 0.15 |

As the results in Table IV illustrate, the quality of bleached oil where the bleaching process followed washing with wastewater treated according to the invention is superior to the quality of bleached oil where the bleaching process followed washing with soft water. In particular, better color reduction was achieved (1.0 R unit lower). The results shown in Table V demonstrate that trace metal reduction where the bleaching process followed washing with wastewater treated according to the invention is equal to the quality of bleached oil where the bleaching process followed washing with soft water.

The invention and the manner and process of making and using it, are now described in such full, clear, concise and exact terms as to enable any person skilled in the art to which it pertains, to make and use the same. Although the foregoing describes preferred embodiments of the present invention, modifications may be made therein without departing from the spirit or scope of the present invention as set forth in the claims. To particularly point out and distinctly claim the subject matter regarded as invention, the following claims conclude this specification.

I claim:

1. A process for treating soybean refinery waste water, comprising:

(a) admixing an aqueous iron salt solution with soybean refinery wastewater to form a iron salt-wastewater mixture, wherein the aqueous iron salt solution is combined with the soybean refinery wastewater in a ratio of from about 1:1 to about 0.01:1;

(b) agitating the iron salt-wastewater mixture for a time of less than about 10 minutes;

(c) passing the agitated iron salt-wastewater mixture through at least one filter device to form a filtered effluent, wherein the filter device is a structured sand bed; and (d) adjusting the pH of the filtered effluent to below about 8 to form purified water, wherein the purified water contains less than about 10 ppm iron and has a transmittance rating of at least about 90 percent.

2. The process according to claim 1, wherein the iron salt is selected from the group consisting of ferrous sulfate, ferric sulfate, and ferric chloride.

3. The process according to claim 1, wherein the iron salt is ferrous sulfate.

4. The process according to claim 1, wherein the aqueous iron salt solution has a concentration based on the combined weight of iron salt and water of from about 10 to about 70 percent by weight.

5. The process according to claim 1, wherein step (b) agitating produces a flow velocity of less than about 20 feet per second.

6. The process according to claim 1, wherein step (b) agitating occurs for a time of less than about 60 seconds.

7. The process according to claim 1, wherein the pH of the filtered effluent is adjusted by the addition of sulfuric acid.

8. The process according to claim 1, wherein the pH of the filtered effluent is adjusted to a value of about 7 by the addition of sulfuric acid.

* * * * *